March 8, 1938.    H. W. LEVERENZ    2,110,161
LUMINESCENT MATERIAL
Filed Jan. 31, 1935
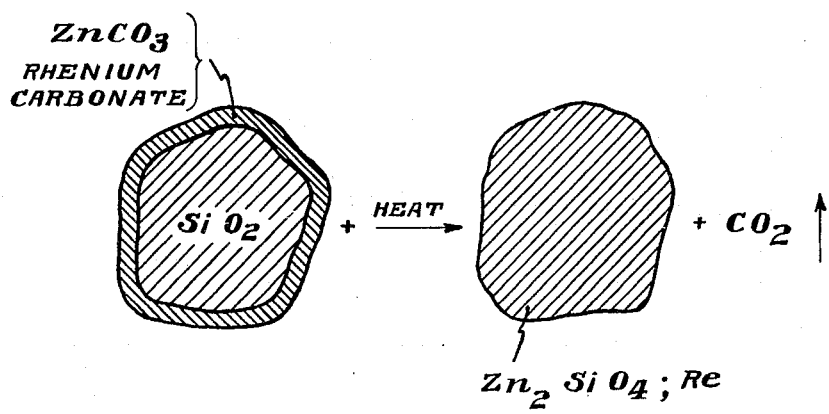
INVENTOR:
Humboldt W. Leverenz
BY T R Goldsborough
ATTORNEY Patented Mar. 8, 1938

2,110,161

UNITED STATES PATENT OFFICE 2,110,161

LUMINESCENT MATERIAL

Humboldt W. Leverenz, Collingswood, N. J., assignor to Radio Corporation of America, a corporation of Delaware Application January 31, 1935, Serial No. 4,289

9 Claims. (Cl. 134—47)

My invention relates to improvements in luminescent materials.

One of the objects of my invention is to provide material adaptable particularly for the so-called luminescent screens for cathode ray tubes used in television receivers, and on which an image of the transmitted object is reproduced, the material having advantages over those proposed heretofore in the way of increased intensity, efficiency, stability, and cathodo-luminescence.

Other objects and advantages will hereinafter appear.

My improved material is an oxygen compound comprising a metal and an element of the fourth vertical column in the periodic system, and rhenium as an activator to give to the compound the characteristics of becoming luminescent when exposed to radiant energy. By "radiant energy" is meant such radiations as electron bombardment, X-rays, or actinic light or similar radiations. The word "activator" as here used, designates the use of an element in relatively small quantities to increase the luminous efficiency of the luminescent material. It appears that the addition of a small quantity of a suitable element commonly known as an "activator" results in the element being held in a pseudo chemical bond, and apparently in a physical bond between the interstices of the elemental crystals comprising the luminescent material. The amount of activator used may be varied over a very wide range and serves to control the properties and characteristics of the resultant luminescent material.

My invention resides in the improved luminescent material of the character hereinafter described and claimed.

The figure of drawing is a pictorial illustration of the action which it is understood takes place in the course of making my improved luminescent material.

In carrying out my invention, the ingredients used are as pure as it is possible to obtain, the steps being as follows:

*First step.*—Solutions of zinc nitrate, $Zn(NO_3)_2$, and rhenium nitrate, $Re(NO_3)_4$, are warmed together and stirred to thoroughly mix the two. Considering a specific case, 20.5 cc. of 3.68 molal $Zn(NO_3)_2$ and 4.32 cc. of 0.1 molal of $Re(NO_3)_4$ were mixed together.

As alternatives in this step, it is proposed to use, instead of the zinc, any other metals such as magnesium, calcium, beryllium, strontium, or any other suitable metal in the first three groups of the periodic system and to use, especially, the alkaline earth metals in group II of this system.

*Second step.*—Finely divided, purified silicon dioxide (silica) is added. The particles of silicon dioxide are very small, preferably less than 100 microns in diameter. These particles may be obtained, for example, by grinding in a ball mill or the like, and then passing the material through a 400 mesh screen. In making the material known as zinc orthosilicate, as hereinafter explained, it is proposed to use the silicon dioxide in about 0.5 to .6 gram-molecular ratio to the zinc. Likewise, in making compounds known as the metasilicates, as hereinafter explained, it is proposed to use the silicon dioxide in about 1.0 to 1.2 gram-molecular ratio to the metal. In the specific case referred to, 2.26 grams of silicon dioxide ($SiO_2$) were added to the mixed solutions of zinc nitrate and rhenium nitrate. The combination was mixed well.

As an alternative in this step, it is proposed to add the silicon dioxide in the form of colloidal silicon dioxide.

As a further alternative, it is proposed to use germanium dioxide instead of silicon dioxide.

*Third step.*—The zinc and rhenium are precipitated as carbonates, oxalates, sulphides, hydroxides or phosphates. When the metals are precipitated as carbonates, this is done by adding sufficient ammonium carbonate or ammonium carbamate ($NH_4HCO_3NH_4NH_2CO_2$) for this purpose, or by making the solution slightly alkaline with ammonium hydroxide and then saturating the same with carbon dioxide. In the specific case referred to, ammonium carbamate was used in this step, 40 cc. of approximately 4.7 normal ammonium carbamate being added to the solution of the nitrates of zinc and rhenium, with the silicon dioxide, as explained. The mixture was then boiled and stirred, decanted while hot, and then evaporated to dryness while stirring. in this step, the zinc and rhenium are precipitated out of solution as insoluble carbonates, the remaining liquid containing only ammonium nitrate.

In the precipitating action, it is understood that the minute silicon dioxide particles serve as nuclei about which the zinc and rhenium carbonates agglomerate. That is, it is understood that each silicon dioxide particle serves as a core to which there adheres one layer or coating of precipitated carbonates of zinc and rhenium. This is represented at the left in the figure of drawing. The result is that, within the limitation of the previous sub-division of the silicon dioxide to practically molecular dimensions, a homogeneous mixture of silicon dioxide and the carbonates of zinc and rhenium is obtained.

*Fourth step.*—The resulting material is elutriated or washed with distilled water to remove practically all the ammonium nitrate. The last washing liquor is decanted, and the remaining mass is dried.

*Fifth step.*—The dried material is then heated in a platinum or other suitable crucible at a temperature from 900° to 2800° centigrade and for a period from 5 to 150 minutes, depending upon the amount of the material and the characteristics of the heating furnace, as will be well understood. In the specific case referred to, the material was heated at about 1200° C. for two hours, and then removed from the furnace and allowed to cool in the air. The resulting material gave a violent color of luminescence under bombardment by the electrons of a cathode ray beam.

In view of the fact that $CO_2$ is driven off during this final heating step, it might very naturally be inferred that the resulting compound would be a mixture of zinc and rhenium silicates. Such is apparently not the case, since the final material seems to be a zinc orthosilicate wherein rhenium is entrained as an activator. The formula, $Zn_2SiO_4$:Re, therefore, has been assigned to my improved synthetic willemite, but it is to be definitely understood that I am not bound by any particular theory of formation thereof. I have used the colon in the above formula to indicate the presence of the thus conjoined metal as rhenium as an activator.

In cases where the zinc and rhenium are precipitated as sulphides, it is proposed, in this step, to heat the material in an atmosphere containing oxygen. This decomposes the sulphides and removes the sulphur as sulphur dioxide.

As an alternative in this step, and in the specific case referred to, it is proposed to melt a small quantity of the material, such as 0.1 to 5.0 grams, at about 1550° C. for about one hour, and then to remove the material from the furnace and cool it rapidly by quenching, such as by plunging the material immediately into water at about 4° C. The resulting material is characterized by the fact that it has an almost white cathodo-luminescence. The color of luminescence, under bombardment by the electrons of a cathode ray, might be said to be greenish yellow.

Where germanium dioxide is used instead of silicon dioxide, the final result is to obtain a luminescent material known as a zinc orthogermanate, wherein rhenium is entrained as an activator. The formula of this material may be expressed as $Zn_2GeO_4$:Re. As an alternative, where zinc is used it is proposed to replace the same by cadmium up to the extent of about 30%. Also, in the first step, the efficiency of secondary emission may be increased by adding a small amount of a suitable substance such as barium, strontium, caesium, cerium, thorium, rubidium, etc. Such a substance can also be added after the carbonates have been formed, such as after the decantation of the last washing water in the fourth step.

Where strontium is used instead of zinc, the resulting material is known as strontium metasilicate, $SrSiO_3$:Re.

Where magnesium is used instead of zinc, the resulting material is known as magnesium orthosilicate, $Mg_2SiO_4$:Re.

The formation of the material known as zinc orthosilicate, with rhenium as the activator, may be expressed as follows:

$$2ZnCO_3 + SiO_2 + Re \rightarrow Zn_2SiO_4\text{:}Re + 2CO_2 \uparrow$$

The formation of the material known as zinc orthogermanate, with rhenium as the activator, may be expressed as follows:

$$2ZnCO_3 + GeO_2 + Re \rightarrow Zn_2GeO_4\text{:}Re + 2CO_2 \uparrow$$

For the purpose of obtaining greater brilliancy as the screen, made of my improved material, is scanned by a cathode ray, it is proposed, in the making of the screen, to mix in with the various ingredients from one percent to ten percent of an element or elements which yield X-rays under cathode ray bombardment. Elements for this purpose may be molybdenum, tungsten, thallium, tin, platinum, etc., or compounds of these elements. The X-rays, having greater penetrating power than the cathode rays, are effective to excite the particles below the surface of the screen, and, also, penetrate further into the individual particles of crystals than the cathode rays. With the addition of an element of the character referred to, therefore, the screen may have greater brilliancy than would otherwise be the case, under the same operating conditions.

For the purpose of obtaining a greater degree of secondary emission, it is also proposed to add to the ingredients, in making my improved material for the screen of a cathode ray tube, a radio-active material such as radium, mesothorium, actinium, or their compounds. The amount of this material added may be from one ten-thousandth of one percent to one percent, as might be required.

The various weights and temperatures given above are not critical in any strict sense of the word, and may be varied over a wide range.

From the foregoing it will be seen that I have provided an improved luminescent material which is an oxygen compound, and which comprises a metal and an element of the fourth vertical column in the periodic system, and rhenium as an activator to give to the compound the characteristic of becoming luminescent upon being excited. The term "excited", as used alone hereinbefore and in the claims, is to be construed as meaning the condition assumed by the material when exposed to electron bombardment, X-rays, alpha-particles, or actinic light.

In making my improved material, as explained, excellent luminescent materials are obtained since the resultant material is for all intents and purposes homogeneous in its luminescent characteristics and properties. This substantially homogeneity is obtained through the use of very finely divided dioxides of the elements in group IV of the periodic system. As pointed out above, by using colloidal particles, their size is so small as to possess practically molecular dimensions, and accordingly, the resultant material macroscopically is homogeneous.

It will be understood that modifications, within the conception of those skilled in the art, are possible without departing from the spirit of my invention or the scope of the claims.

I claim as my invention:

1. A metallic ortho-germanate activated by rhenium which gives to the combination the characteristic of becoming luminescent upon being excited by "radiant energy".

2. A metallic orthosilicate activated by rhenium which gives to the combination the characteristic of becoming luminescent upon being excited by "radiant energy".

3. A luminescent compound comprising a metal selected from those included in groups I through III of the periodic series of the elements combined with an oxygen containing acid of a metal selected from group IV of the periodic series of the elements, and a rhenium activator.

4. A luminescent composition of matter comprising a chemical compound of zinc, an element selected from group IV of the periodic series of the elements and oxygen, and a rhenium activator.

5. The luminescent composition of matter claimed in claim 4 comprising in addition a minute amount of radio active material selected from the group consisting of radium, mesothorium, and actinium.

6. A luminescent compound comprising zinc orthosilicate and a rhenium activator.

7. A luminescent compound comprising a metallic orthosilicate and a rhenium activator.

8. A luminescent compound comprising a metallic ortho-germanate and a rhenium activator.

9. A macroscopically homogeneous luminescent compound, comprising a salt of a metal selected from group I through III of the periodic series with an oxygen containing acid of one of the elements of group IV of the periodic series and rhenium as an activator.

HUMBOLDT W. LEVERENZ.